United States Patent [19]

Namiki et al.

[11] Patent Number: 5,359,230
[45] Date of Patent: Oct. 25, 1994

[54] ON-VEHICLE ELECTRONIC DEVICE

[75] Inventors: Akio Namiki; Yoshio Aoyagi; Shigetoshi Kato; Osamu Yoshizawa; Hiroshi Wakimoto; Akira Kawahara; Takayuki Iijima, all of Kawagoe, Japan

[73] Assignee: Pioneer Electronic Corporation, Tokyo, Japan

[21] Appl. No.: 930,999

[22] Filed: Aug. 17, 1992

[30] Foreign Application Priority Data

Aug. 27, 1991 [JP] Japan ................... 3-215474

[51] Int. Cl.$^5$ ............................................. B60L 1/08
[52] U.S. Cl. .................... 307/10.1; 307/125; 307/98
[58] Field of Search ............... 361/391, 422; 312/7.1; 307/10.1, 116, 125, 98, 241, 134, 141; 360/67; 340/426

[56] References Cited

U.S. PATENT DOCUMENTS

| 4,542,421 | 9/1985 | Fujibayashi | 360/67 |
| 4,734,896 | 3/1988 | Soma et al. | 307/10.1 |
| 4,945,335 | 7/1990 | Kimura et al. | 340/426 |
| 5,107,244 | 4/1992 | Minamide et al. | 340/426 |

Primary Examiner—A. D. Pellinen
Assistant Examiner—Peter Ganjoo
Attorney, Agent, or Firm—Kane, Dalsimer, Sullivan, Kurucz, Levy, Eisele and Richard

[57] ABSTRACT

An on-vehicle electronic device includes a main body which is fastened to a vehicle and has a first terminal, and an operation unit which is detachably mounted in the main body and which has a second terminal electrically connected to the first terminal when the operation unit is mounted in the main body. The main body includes a reference power source applying a reference voltage to the first terminal, and a voltage detection unit for detecting a voltage applied to the first terminal. The main body further includes a mounting detection unit. The mounting detection unit determines, based on a difference between a first detection voltage detected by the voltage detection unit when the operation unit is mounted and a second detection voltage detected by the voltage detection unit when the operation unit is not mounted, whether or not the operation unit is mounted and electrically connected to the main body via the first and second terminals.

8 Claims, 7 Drawing Sheets

FIG. 5

| DETACH CONNECTOR | FUNCTION |
|---|---|
| 1 | GND |
| 2 | KEY DATA |
| 3 | VLCD |
| 4 | CE |
| 5 | BACK LIGHT G |
| 6 | BUSY |
| 7 | BACK LIGHT A |
| 8 | CLK |
| 9 | ILLUMI GND |
| 10 | DATA |
| 11 | DSENS |
| 12 | ILLG |
| 13 | ILLA |
| 14 | DSET |
| D SENSE VOLTAGE | 1.304V~2.350V |

FIG. 7

| DETACH CONNECTOR | 1 | GND |
|---|---|---|
| | 2 | RIMOTE CONTROL DATA |
| | 3 | VDD |
| | 4 | CE |
| | 5 | BACK LIGHT +B |
| | 6 | CLK |
| | 7 | ILLUMI +B |
| | 8 | KD1 |
| | 9 | KD2 |
| | 10 | KD3 |
| | 11 | KD4 (DSENS) |
| | 12 | DATA |
| | 13 | G/A |
| | 14 | DSET |
| D SENSE VOLTAGE | | 3.1519V~4.3578V |

ON-VEHICLE ELECTRONIC DEVICE

BACKGROUND OF THE INVENTION

1. Field of the Invention

The present invention generally relates to an on-vehicle electronic device, such as a car stereo device, and more particularly to an on-vehicle electronic device having burglarproof function.

2. Description of the Related Art

There are two types of car stereo devices. A first type of the car stereo devices is fixedly or permanently installed in a cockpit, and a second type thereof is detachably installed. The car stereo devices of the second type can be protected against burglary by detaching them from the cars when the users leave the cars.

There are, as detachment mechanisms for such car stereo devices of detachably installed type, a partially detachable system and a totally detachable system. In the partially detachable system, only essential parts of the car stereo device are detached from the cockpit. In the totally detachable system, the whole car stereo device is detached from the cockpit.

A description will now be given for the partially detachable system.

In the partially detachable system, an operation panel is detachably mounted in front of a cabinet which is fixed to the vehicle. A cassette tape is inserted into the cabinet via an opening. Main parts of the car stereo device are provided in the operation panel. Hence, the car stereo device with the operation panel detached therefrom does not function. In this manner, the above detachment mechanism of the operation panel substantially serves as a burglarproof means.

A mechanical switch for detecting the presence of the operation panel is attached to the cabinet. When the operation panel is mounted into the cabinet, a projection provided on a back surface of the operation panel comes into contact with the mechanical switch, and presses it. Thereby, the mechanical switch is turned ON. Then, the turned ON signal of the mechanical switch is detected as a signal indicating whether or not the operation panel is mounted to the cabinet.

However, the above-mentioned car stereo device of the partially detachable type has the following disadvantages. First of all, in order to detect the presence of the operation panel, it is necessary to provide the mechanical switch and a circuit for detecting the state of the switch. This needs a complex configuration and increases the production cost.

Secondly, in this car stereo device, even if an operation panel of another electronic device is mistakenly mounted into the cabinet, the detection mechanism detects the presence of the operation panel since the mechanical switch is operated even by the mistakenly mounted electronic device. In other words, the detection mechanism of this type of car stereo device cannot detect the fact that another operation panel is mistakenly mounted.

In another detection mechanism for such car stereo devices of detachably installed type, there are provided terminals fastened to the cabinet, such that one terminal is connected to the mechanical switch, and the other terminal is grounded. Further, there are provided terminals, which are short-circuited, fastened to the operation panel at positions facing to the terminals of the cabinet.

Accordingly, when the operation panel is placed in position, a current path is established between the cabinet and the operation panel via the terminals only when an appropriate operation panel is mounted. Thus, if the operation panel of another electronic device, which has terminals located at positions different from those of the terminals of the pertinent operation panel, is mistakenly mounted to the cabinet, no current flows through the terminals, so that the judgement whether or not an appropriate operation panel is mounted can be performed by use of the current flow through the terminal.

However, this type of detection mechanism using the terminals, essentially has a following problem. Namely, it is necessary for the operation panels of electronic devices of different types to have the terminals located at different positions, resulting in the increases of the cost and difficulty of the production.

It will be noted that other detachable audio devices, such as radios, have disadvantages as described above.

SUMMARY OF THE INVENTION

It is therefore an object of the present invention to provide an on-vehicle electronic device capable of detecting the presence of an appropriate operation panel without a special switch.

The above object of the present invention can be achieved by an on-vehicle electronic device comprising a main body which is fastened to a vehicle and has a first terminal, and an operation unit which is detachably mounted in the main body and which has a second terminal electrically connected to the first terminal when the operation unit is mounted in the main body. The main body comprises a reference power source applying a reference voltage to the first terminal, a voltage detection unit for detecting a voltage applied to the first terminal, and a mounting detection unit, coupled to the voltage detection unit, for determining, based on a difference between a first detection voltage detected by the voltage detection unit when the operation unit is mounted and a second detection voltage detected by the voltage detection unit when the operation unit is not mounted, whether or not the operation unit is mounted and electrically connected to the main body via the first and second terminals.

Accordingly, this on-vehicle electronic device can detect the presence of an appropriate operation panel in the cabinet, by detecting the voltage at the first terminal which is generated by the reference power source and is affected by the connecting condition between the first and second terminals, without the use of the mechanical switch.

The above-mentioned object of the present invention can be also achieved by an on-vehicle electronic device comprising a main body which is fastened to a vehicle and has a first terminal, and an operation unit detachably mounted in the main body. The operation unit comprises a plurality of operation input keys, and a second terminal electrically connected to the first terminal when the operation unit is mounted in the main body. The main body comprises an operation input key identifying unit for identifying which one of the operation input keys is manipulated in a state where the operation input unit is mounted in the main body, a voltage detection unit for detecting a voltage of an input signal generated by the operation input key identifying unit, and a mounting detection unit, coupled to the voltage detection unit, for determining, based on a difference between a first detection voltage detected by the voltage detection unit when the operation unit is mounted and a second detection voltage detected by the voltage detection unit when the operation unit is not mounted, whether the operation unit is mounted and electrically connected to the main body via the first and second terminals.

Accordingly, this on-vehicle electronic device can detect the presence of an appropriate operation panel in the cabinet, without the use of the mechanical switch.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram showing functions of contact pins used in the first embodiment of the present invention of FIG. 4;

FIG. 7 is a diagram showing functions of contact pins used in the second embodiment of the present invention of FIG. 6.

DESCRIPTION OF THE PREFERRED EMBODIMENTS

A description will now be given for a partially detachable system of a car stereo device as one embodiment of the present invention, with reference to FIGS. 1 through 3.

Figure 1:
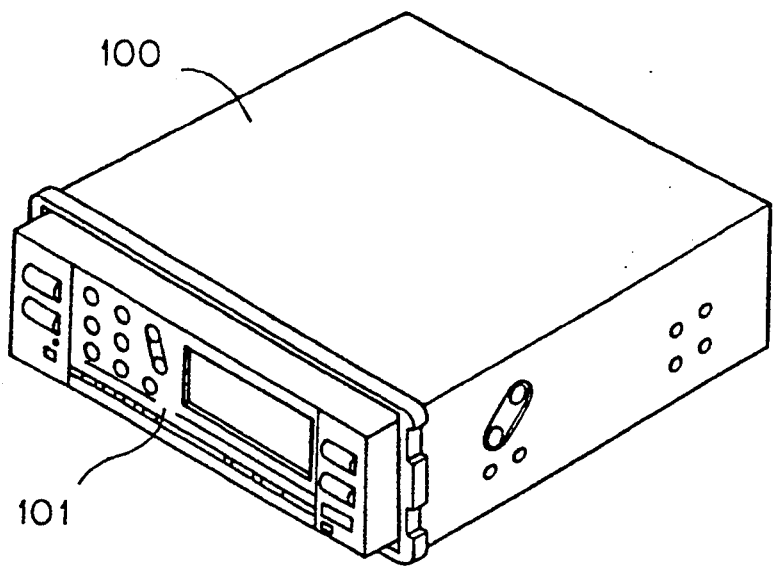
FIG. 1 is a perspective view of an on-vehicle electronic device as a first embodiment of the present invention.
Figure 2:
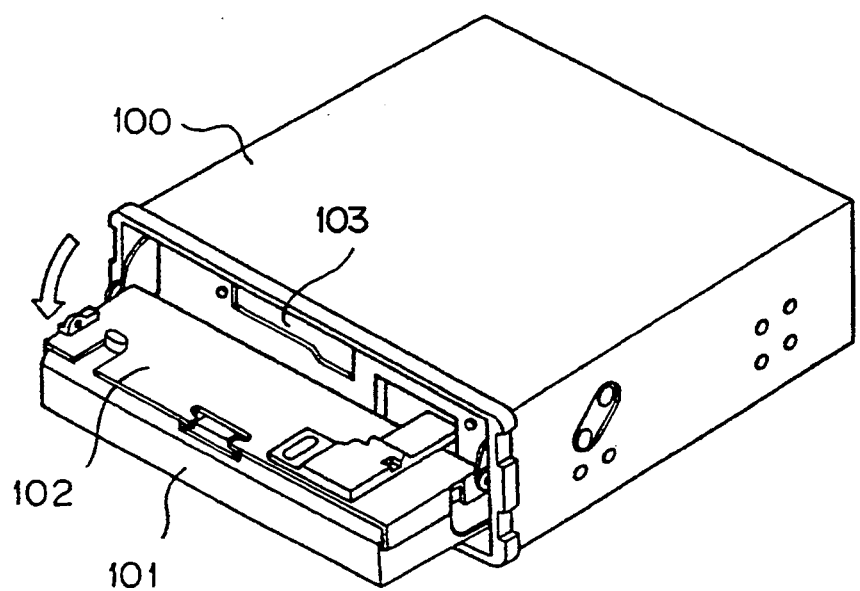
FIG. 2 is a perspective view of the on-vehicle electronic device of FIG. 1, with an inner lid thereof opened.

In FIG. 1, the car stereo device has a cabinet 100 and an operation panel 101 disposed in front of the cabinet 100. The operation panel 101 is detachably supported by an inner lid 102, which is pivotably fixed on the cabinet main body to be opened and closed as shown in FIG. 2. When the operation panel 101 is to be detached from the cabinet 100, the operation panel 101 is opened together with the inner lid 102. In this case, the operation panel 101 is detached from the inner lid 102, as shown in FIG. 3. A cassette tape is inserted into the cabinet 100 via an opening 103 shown in FIGS. 2 and 3.

Figure 3:
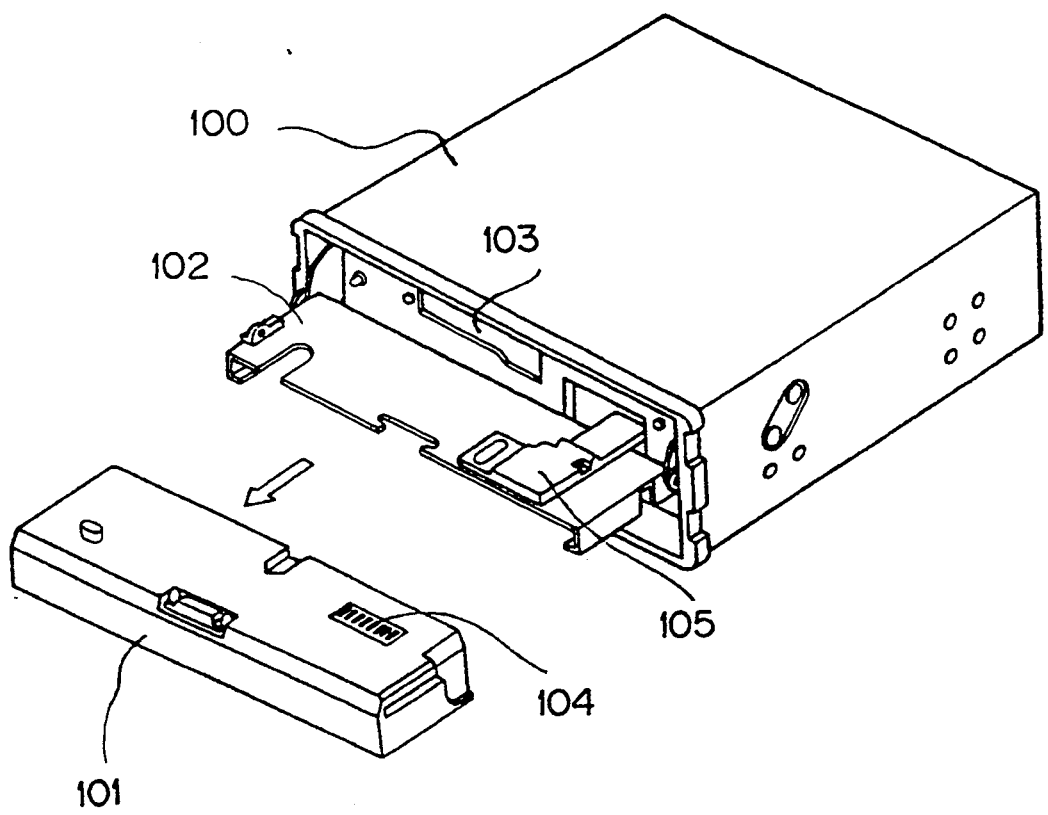
FIG. 3 is a perspective view of the on-vehicle electronic device of FIG. 1, with an operation panel detached therefrom.

In FIG. 3, the operation panel 101 is provided with a contact terminal 104 including a plurality of contact pins, while the cabinet 100 is provided with a contact terminal 105, which includes a plurality of contact pins and is adapted to be connected with the contact terminal 104 when the operation panel 101 is set to the inner lid 102.

Main parts of the car stereo device are provided in the operation panel 101. Hence, the car stereo device with the operation panel 101 detached therefrom does not function. In this manner, the detachment mechanism of the operation panel 101 substantially serves as a burglarproof means.

Figure 4:
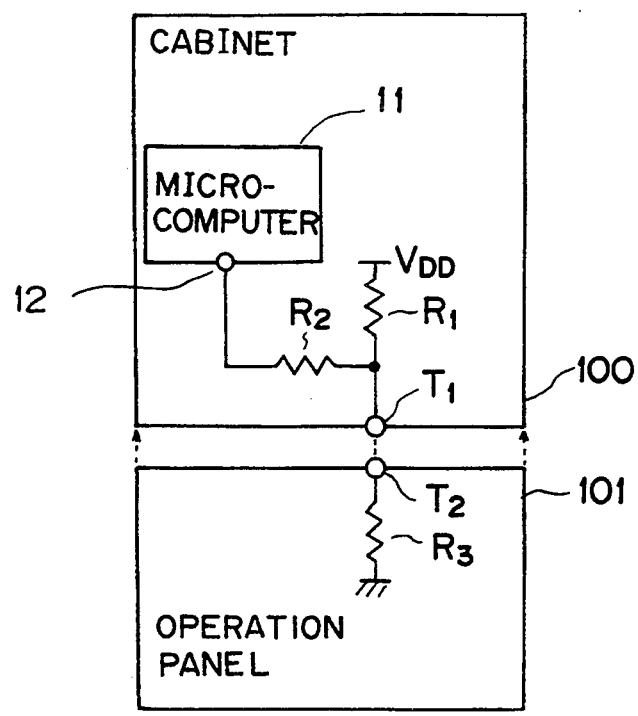
FIG. 4 is a block diagram of the first embodiment of the present invention.

FIG. 4 shows the internal circuit related to the burglarproof function of the cabinet 100 and the operation panel 101 of the first embodiment.

More particularly, the cabinet 100 is provided with a microcomputer 11 as a controller, resistors $R_1$ and $R_2$, a voltage source $V_{DD}$, and a detachment sense pin T1. The operation panel 101 is provided with a register R3 and a detachment sense pin T2.

The cabinet 100 and the operation panel 101 are detachably connected to each other via the terminals 104 and 105 shown in FIG. 3, including the detachment sense pins T1 and T2, respectively.

As shown in FIG. 5, each of the cabinet 100 and the operation panel 101 includes a connector having 14 pin terminals. The pin #11 labeled DENSE is used for determining whether or not the operation panel 101 has been mounted. This determination process is referred to as a detachment sense process. A detachment sense voltage is a voltage between, for example, 1.304 V and 2.350 V. When it is detected that a voltage within the above voltage range is applied to the pin #11, it is determined by the microcomputer 11 that the operation panel 101 has been mounted. It is preferable that the detachment sense voltage be set to a voltage not equal to 0 V. Hence, even if the pin #11 is short-circuited, it is not determined that the operation panel 101 has been mounted.

The detachment sense pin T1 shown in FIG. 4 is fastened to the cabinet 100 and corresponds to the above pin #11, is connected to an A/D (Analog-to-Digital) port 12 of the microcomputer 11. A detachment sense circuit, which detects whether or not the operation panel 101 has been mounted, is connected to the A/D port 12. The A/D port 12 is a circuit that generates digital data indicating a voltage range in which an analog input signal applied to the A/D port 12 is present. For example, in a case where the A/D port 12 is designed to have an analog input voltage range of 0 V to 10 V, the A/D port 12 generates digital data "00" when the analog input voltage is between 0 V and 2.5 V, and data "01" when the analog input voltage is between 2.5 V and 5.0 V. Further, in the above vase, the A/D port 12 generates digital data "10" when the analog input voltage is between 5.0 V and 7.5 V, and generates digital data "11" when the analog input voltage is between 7.5 V and 10 V.

The detachment sense circuit provided in the cabinet 100 includes the resistors $R_1$ and $R_2$. The resistor $R_1$ is connected between a reference power source $V_{DD}$ and the detachment sense pin $T_1$. The resistor $R_2$ is connected between the A/D port 12 and the detachment sense pin $T_1$. The operation panel 101 includes the detachment sense circuit, which consists of the resistor $R_3$ connected to the detachment sense pin $T_2$ attached to the operation panel 101 and the ground.

A description will now be given for the operation of the first embodiment shown in FIG. 4. When the terminals i.e. the detachment sense pins $T_1$ and $T_2$ are not connected to each other, a reference voltage of the reference power source $V_{DD}$ is applied to the A/D port 12 of the microcomputer 11, via the resistors $R_1$ and $R_2$. In the above-mentioned case, if a threshold voltage is 1.7 V, the resistance values of the resistors $R_1$ and $R_2$ are selected so that a voltage applied to the A/D port 12 is between 1.7 V and 2.350 V (that voltage corresponding to a "H" level). In actuality, it is preferred that the resistance values of the resistors $R_1$ and $R_2$ be selected so that a voltage higher than the threshold voltage is applied to the A/D port 12 in order to make sure the detecting operation. When the microcomputer 11 detects the "H" voltage between 1.7 V and 2.350 V applied to the A/D port 12, the microcomputer 11 understands that the operation panel 101 has not been mounted.

When the terminals $T_1$ and $T_2$ are connected to each other, a current from the reference power source $V_{DD}$ flows to the ground via the resistor $R_1$, the detachment sense pin $T_1$ attached to the cabinet 100, the detachment sense pin $T_2$ attached to the operation panel 101, and the resistor $R_3$. The resistance value of the resistor $R_3$ is adjusted so that a voltage applied to the A/D port 12 falls into a voltage range between 1.304 V and 1.7 V (that voltage corresponding to a "L" level). When the microcomputer 11 detects a voltage within the above voltage range, it understands that the operation panel 101 has duly been mounted. Then, the microcomputer 11 starts to execute a control operation so that electricity is supplied to the operation panel 101, so that the operation panel 101 is activated. In this state, the user can operate the operation panel 101.

According to the first embodiment of the present invention, it is possible to easily detect whether or not the operation panel 101 has been correctly mounted in the cabinet 100. It is easily possible for different electronic devices to have different detachment sense voltages by adjusting the resistor $R_3$ in the operation panel 101. In this manner, it becomes possible to prevent the electronic device 10 from operating in a state where an operation panel which does not match the operation panel has been mounted, without changing the structure of the contact terminals.

A description will now be given, with reference to FIGS. 6 and 7, of an on-vehicle electronic device according to a second embodiment of the present invention. The cabinet of the second embodiment is the same as that of the first embodiment. The second embodiment has an operation panel different from the operation panel 101 of the first embodiment.

Figure 6:
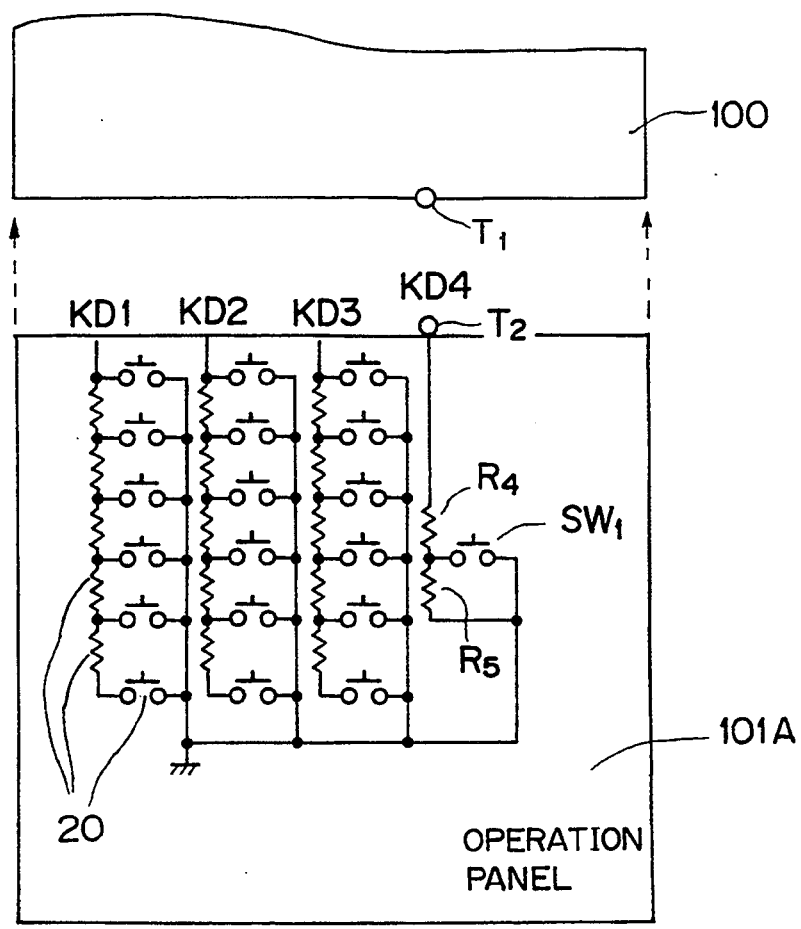
FIG. 6 is a circuit diagram of an operation panel including a key switch circuit in a second embodiment of the present invention.

FIG. 6 shows an operation panel 101A of the second embodiment of the present invention. As shown in FIG. 6, a key switch circuit 20 of the operation panel 101A includes 19 key switches, and 17 resistors. Key data output from the key switch circuit 20 is transferred to the cabinet 100 via four key sense lines KD1–KD4. In the second embodiment of the present invention, the key sense line KD4 is also used as a detachment sense circuit. A detachment sense voltage is set to be between, for example, 3.1519 V and 4.3578 V. It is preferable that the detachment sense voltage be set to a voltage other than 0 V in order to prevent erroneous understanding such that the operation panel 101A were mounted if the connector is short-circuited by a metal or the like.

The key sense line KD4 is connected to the A/D port 12 of the microcomputer 11 via the detachment sense pin $T_2$ attached to the operation panel 101A and the detachment sense pin $T_1$ attached to the cabinet 100. A detachment sense circuit, which is provided in the cabinet 100 and detects whether or not the operation panel 101A has been mounted, is connected to the A/D port 12. As shown in FIG. 4, the detachment sense circuit provided in the cabinet 100 includes the aforementioned resistor $R_1$ connected to the reference power source $V_{DD}$ and the detachment sense pin $T_1$, and the resistor $R_2$ connected to the A/D port 12 of the microcomputer 11 and the detachment sense pin $T_1$.

A detachment sense circuit provided in the operation panel 101A includes resistors $R_4$ and $R_5$ connected in series. The resistor $R_4$ is connected to the detachment sense pin $T_2$, and the resistor $R_5$ is grounded. A switch $SW_1$ is connected between a node at which the resistors $R_4$ and $R_5$ are connected in series to each other and the ground.

As shown in FIG. 7, the operation panel 101A includes a connector having 14 terminal pins. As shown in FIG. 6, the operation panel 101A has 19 keys. The key sense lines KD1–KD4 are connected to pins #8–#11 as shown in FIG. 7, respectively, and are used for determining which one of the 19 keys is pressed. The pin #11 is used as the detachment sense pin $T_2$.

A description will now be given for the operation of the second embodiment of the present invention. In the state where the detachment sense pin $T_2$ attached to the operation panel 101A is not connected to the detachment sense pin $T_1$ of the cabinet 100, the voltage of the reference power source $V_{DD}$ is applied to the A/D port 12 via the resistors $R_1$ and $R_2$. In the above-mentioned case, when the threshold voltage is 3.75 V, the resistance values of the resistors $R_1$ and $R_2$ are adjusted so that a voltage applied to the A/D port 12 is between 3.75 V and 4.3578 V (that voltage corresponding to a "H" level). When the microcomputer 11 detects the "H" level at the A/D port 12, it understands that the operation panel 101 has not been mounted.

In the state where the detachment sense pin $T_2$ attached to the operation panel 101A is connected to the detachment sense pin $T_1$ of the cabinet 100, a current from the reference power source $V_{DD}$ flows to the ground via one of the following two routes. One of the routes includes the reference power source $V_{DD}$, the resistor $R_1$, the detachment sense pin $T_1$ of the cabinet 100, the detachment sense pin $T_2$ of the operation panel 101A, and the resistors $R_4$ and $R_5$. The other route includes the reference power source $V_{DD}$, the resistor $R_1$, the detachment sense pin $T_1$ of the cabinet 100, the detachment sense pin $T_2$ of the operation panel 101A, the resistor $R_4$ and the switch $SW_1$. The resistance values of the resistors $R_4$ and $R_5$ are adjusted so that a voltage applied to the A/D port 12 is between 3.1519 V and 3.75 V (that voltage corresponding to a "L" level). When the microcomputer 11 detects the "L" level at the A/D port 12, it understands that the operation panel 101A has been mounted. Then, the microcomputer 101A starts to execute a control operation so that electricity is supplied to the operation panel 101A.

According to the second embodiment of the present invention, it is possible to easily detect whether or not the operation panel 101 has been correctly mounted in the cabinet 100. It is further possible to use a part of the circuit for determining which key is operated in order to form the detachment sense circuit. Hence, it is not necessary to provide an exclusive circuit for forming the detachment sense circuit. Moreover, it is easily possible for different electronic devices to have different detachment sense voltages by adjusting the resistance values of the resistors $R_4$ and $R_5$ in the operation panel 101A. In this manner, it becomes possible to prevent the electronic device from operating in a state where an operation panel which does not match the operation panel has been mounted.

A description will now be given for an electronic device according to a third embodiment of the present invention. The third embodiment uses a cabinet identical to the cabinet 100 used in the first and second embodiments. The third embodiment is different from the first embodiment in that the detachment sense line is formed by means of a part of the key sense lines, as in the case of the second embodiment. Further, the third embodiment is different from the second embodiment in that a plurality of keys are provided for the detachment sense line.

Figure 8A:
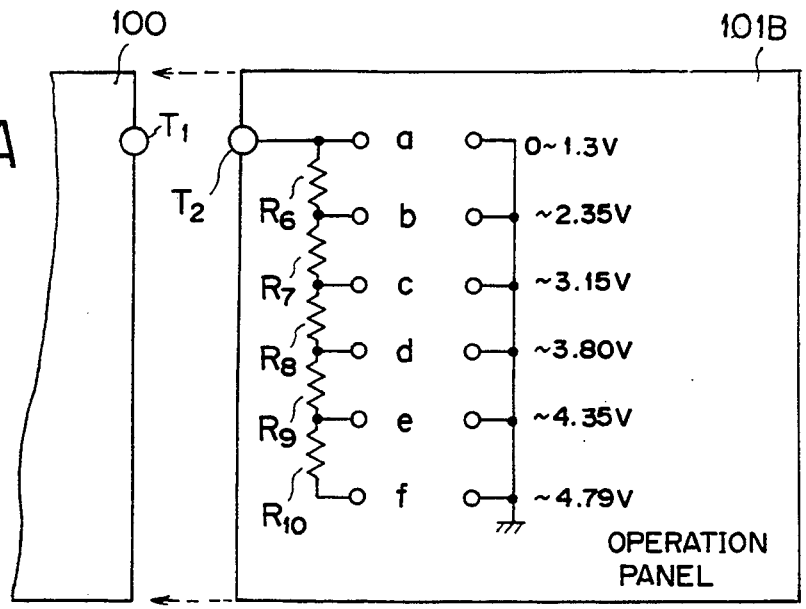
FIGS. 8A and 8B are diagrams each showing an operation panel including a key switch circuit in a third embodiment of the present invention.
Figure 8B:
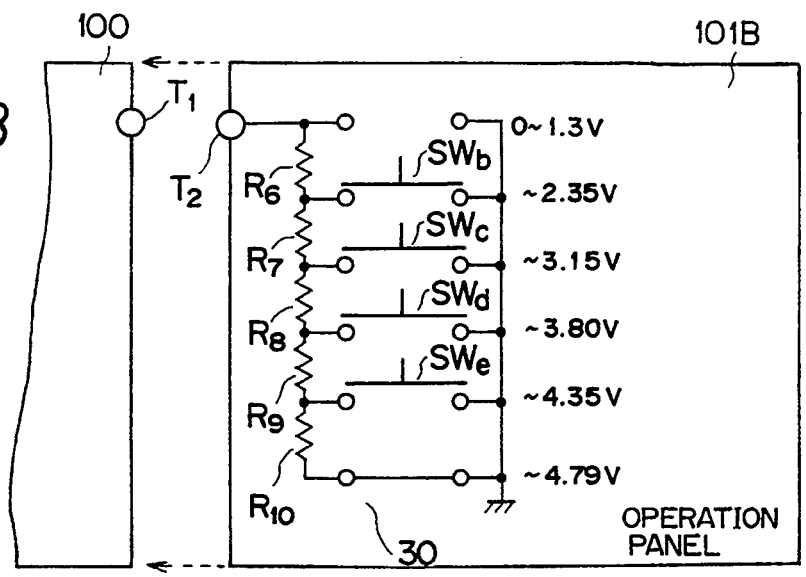

FIG. 8A shows an operation panel 101B of the third embodiment of the present invention. The input voltage range of the A/D port 12 is divided into six voltage ranges. If it is not necessary to take into account a possibility that an operation panel of another electronic device is mistakenly mounted, in a key switch circuit 30 shown in FIG. 8B, it is possible to commonly use a maximum of four key switches and one data sense line. More particularly, two terminals f are short-circuited, and key switches SWb, SWc, SWd and SWe are provided between terminals b, c, d and e, respectively. When a voltage between 1.3 V and 4.79 V is detected at the A/D port 12 in the cabinet 100, it is possible to detect that the operation panel 101B has been correctly mounted. It is possible to take into account, in the following manner, the fact an operation panel of another electronic device is mistakenly mounted.

Namely, in a first type of electronic device including the operation panel 101B, a key switch is connected between terminals b, and the terminals c are short-circuited. In a second type of electronic device, key switches are respectively provided between terminals d and terminals e, and the terminals f are short-circuited. Thus, when a voltage between 1.3 V and 3.15 V is detected at the A/D port 12, the microcomputer 11 understands that the operation panel for the first electronic device has been mounted. When a voltage between 3.15 V and 4,79 V is detected at the A/D port 12, the microcomputer 11 understands that the operation panel for the second electronic device has been mounted. In other words, it is possible to understand that an operation panel of another electronic device has been mounted and thus generate an alarm signal notifying the user of erroneous mounting.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An on-vehicle electronic device comprising:
  a main body which is fastened to a vehicle and has a first terminal; and
  an operation unit detachably mounted in said main body, said operation unit comprising a second terminal electrically connected to said first terminal when said operation unit is mounted in said main body, and a detachment sense voltage generating means for generating at said second terminal a predetermined detachment sense voltage which value is not equal to 0 volt and is determined by a voltage applied from said first terminal to said second terminal,
  wherein the predetermined detachment sense voltage is set depending on a type of said on-vehicle electric device and said main body comprises:
  a reference power source applying a reference voltage to said first terminal;
  voltage detection means for detecting a voltage applied to said first terminal; and
  mounting detection means, coupled to said voltage detection means, for determining that said operation unit is mounted in and electrically connected to said main body if said voltage detection means detects the predetermined detachment sense voltage, and determining that said operation unit is not mounted in said main body if said voltage detection means detects a voltage other than the predetermined detachment sense voltage.

2. An on-vehicle electronic device as claimed in claim 1, wherein:
  said main body comprises a first connector comprising a plurality of terminal pins, one of which corresponds to said first terminal; and
  said operation unit comprises a second connector which is engaged with said first connector and comprises a plurality of terminal pints, one of which corresponds to said second terminal.

3. An on-vehicle electronic device as claimed in claim 1, wherein said main body comprises an inner lid which detachably supports said operation unit.

4. An on-vehicle electronic device as claimed in claim 1, wherein said mounting detection means comprises a microcomputer having an analog-to-digital port to which said first terminal is electrically connected.

5. An on-vehicle electronic device comprising:
  a main body which is fastened to a vehicle and has a first terminal; and
  an operation unit detachably mounted in said main body, said operation unit comprising a plurality of operation input keys, a second terminal electrically connected to said first terminal when said operation unit is mounted in said main body, and a detachment sense voltage generating means for generating at said second terminal a predetermined detachment sense voltage which value is not equal to 0 volt and is determined by a voltage applied from said first terminal to said second terminal,
  wherein the predetermined detachment sense voltage is set depending on a type of said on-vehicle electric device and said main body comprises:
  operation input key identifying means for identifying which one of the operation input keys is manipulated in a state where said operation unit is mounted in said main body;
  voltage detection means for detecting a voltage of signal inputted to said operation input key identifying means; and
  mounting detection means, coupled to said voltage detection means, for determining that said operation unit is mounted in and electrically connected to said main body if said voltage detection means detects the predetermined detachment sense voltage, and determining that said operation unit is not mounted in said main body if said voltage detection means detects a voltage other than the predetermined detachment sense voltage.

6. An on-vehicle electronic device as claimed in claim 5, wherein said second terminal is connected to a ground via one key switch which is linked with one of said operation input keys.

7. An on-vehicle electronic device as claimed in claim 5, wherein said second terminal is connected to a ground via a plurality of key switches which are respectively linked with said operation input keys.

8. An on-vehicle electronic device, comprising:
a main body which is fastened to a vehicle and has a first terminal; and
an operation unit detachably mounted in said main body, said operation unit comprising a second terminal electrically connected to said first terminal when said operation unit is mounted in said main body, and a detachment sense voltage generating means for generating at said second terminal a predetermined detachment sense voltage which value is not equal to 0 volt and is determined by a voltage applied from said first terminal to said second terminal,
wherein said main body comprises:
a reference power source applying a reference voltage to said first terminal;
voltage detection means for detecting a voltage applied to said first terminal; and
mounting detection means, coupled to said voltage detection means, for determining that said operation unit is mounted in and electrically connected to said main body if said voltage detection means detects the predetermined detachment sense voltage, and determining that said operation unit is not mounted in said main body if said voltage detection means detects a voltage other than the predetermined detachment sense voltage and wherein:
said voltage detection means comprises a first resistor connected between said reference power source and said first terminal, and a second resistor connected between said mounting detection means and said first terminal; and
said detachment sense voltage generating means comprises a third resistor connected between said second terminal and a ground.

* * * * *